(12) United States Patent
Stiekes (10) Patent No.: US 9,106,578 B2
(45) Date of Patent: Aug. 11, 2015

(54) CORE NETWORK ARCHITECTURE

(75) Inventor: Bryan Stiekes, Brownstown Township, MI (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 509 days.

(21) Appl. No.: 13/485,837

(22) Filed: May 31, 2012

(65) Prior Publication Data

US 2013/0322427 A1 Dec. 5, 2013

(51) Int. Cl.
*H04L 12/66* (2006.01)
*H04L 12/931* (2013.01)
*H04L 12/933* (2013.01)

(52) U.S. Cl.
CPC .............. *H04L 49/356* (2013.01); *H04L 49/45* (2013.01); *H04L 49/15* (2013.01)

(58) Field of Classification Search
CPC ........ H04L 49/15; H04L 49/45; H04L 49/356
See application file for complete search history.

(56) References Cited

U.S. PATENT DOCUMENTS

| | | | | |
|---|---|---|---|---|
| 2003/0200330 A1* | 10/2003 | Oelke et al. | .................... | 709/238 |
| 2004/0022185 A1* | 2/2004 | Wils et al. | ...................... | 370/226 |
| 2006/0018302 A1* | 1/2006 | Ivaldi et al. | .................... | 370/351 |
| 2006/0039384 A1* | 2/2006 | Dontu et al. | .................... | 370/400 |
| 2006/0165077 A1* | 7/2006 | Wybenga et al. | ............. | 370/389 |
| 2007/0280258 A1* | 12/2007 | Rajagopalan et al. | ...... | 370/395.3 |
| 2008/0126548 A1* | 5/2008 | Moore et al. | .................... | 709/227 |
| 2008/0279106 A1* | 11/2008 | Goodfellow et al. | ......... | 370/238 |
| 2010/0020806 A1* | 1/2010 | Vahdat et al. | ............ | 370/395.31 |
| 2010/0268764 A1* | 10/2010 | Wee et al. | ...................... | 709/203 |
| 2011/0075674 A1* | 3/2011 | Li et al. | .......................... | 370/401 |
| 2012/0113835 A1* | 5/2012 | Alon et al. | ..................... | 370/252 |
| 2012/0182866 A1* | 7/2012 | Vinayagam et al. | .......... | 370/228 |
| 2012/0243552 A1* | 9/2012 | Goodfellow et al. | ......... | 370/419 |
| 2013/0194914 A1* | 8/2013 | Agarwal et al. | ............... | 370/225 |
| 2013/0242993 A1* | 9/2013 | Basso et al. | .................... | 370/390 |
| 2013/0243008 A1* | 9/2013 | Singla et al. | .................. | 370/422 |
| 2013/0272161 A1* | 10/2013 | Kotrla et al. | ................... | 370/254 |

OTHER PUBLICATIONS

Greenberg et al., Vl2: a Scalable and Flexible Data Center Network, Microsoft Research, SIGCOMM '09, Aug. 17-21, 2009, Barcelona, Spain, http://ccr.sigcomm.org/online/files/p51.pdf.

Greenberg, et al, Towards a Next Generation Data Center Architecture: Scalability and Commoditization, Microsoft Research, Redmond, WA, USA, Presto-08, Aug. 22, 2008, http://research.microsoft.com/pubs/79348/presto27-greenberg.pdf.

* cited by examiner

*Primary Examiner* — Ajay Cattungal (74) *Attorney, Agent, or Firm* — Hewlett-Packard Patent Department (57) ABSTRACT

A network includes at least two core local area network (LAN) fabrics, each including a first core switch cluster deployed at a first sub-core and a second core switch cluster deployed at a second sub-core different from the first sub-core. The network also includes a multi-port link aggregation group to link the first core switch cluster and the second core switch cluster.

28 Claims, 6 Drawing Sheets

CORE NETWORK ARCHITECTURE

BACKGROUND

A broad spectrum of industries including healthcare, education, manufacturing, transportation, banking, and government depend on their networks to deliver fast, reliable access to information at relatively low cost. For example, data center network architectures are challenged to cost effectively meet scale, performance and availability requirements. A data center network can be represented as a hierarchical structure consisting of a core layer, an aggregation (or distribution) layer, and an edge layer (also known as access layer) layers. The access layer is a mesh of network switches, linked to other switches in the aggregation layer, which in turn is linked to the core. The lattice of switches provides multiple paths for network traffic, such that if one link or switch goes down, traffic can continue to flow using an alternate path. The performance and extensibility of these devices (i.e., the multi-layer switches) is a critical enabler of large-scale, highly-available, high-performance data center networks. However, the cost of the multi-layer switches is often a hindrance to scaling and maximizing performance. In addition, the modular nature of the switches often represents a lock-in to a specific device vendor, further reducing the data center's availability. Cloud computing environments in particular have unique needs for scale and performance which exceed traditional enterprise-level requirement. Thus, there is a need to provide network architectures (e.g., data center networks, campus Ethernet networks, and cloud computing networks) that cost effectively meet scale, performance, and availability requirements.

DETAILED DESCRIPTION

Introduction:

Various embodiments described below were developed to provide core network architecture that cost effectively meet scale, performance, and availability requirements. For example, the core network architecture may include a data center core network architecture arranged and configured to provide a scalable, low-cost, and highly resilient core network for cloud data centers.

Traditional data center network architectures are challenged to cost effectively meet scale, performance, and availability requirements. A typical data center network can be represented as a hierarchical structure consisting of core, aggregation, and edge layers. Network access is facilitated by a large number of horizontally scalable edge layer devices whose uplink connectivity is terminated, on highly functional aggregation layer devices creating a data center local area network (LAN) fabric or "availability zone." For scale and reliability purposes, multiple availability zones are interconnected by the data center network core which also provides a mechanism for the integration of communication circuits.

Typical data center network cores are constructed using large-scale and highly capable modular multi-layer switches. The performance and extensibility of these devices is a critical enabler of large-scale, highly-available, high-performance data center networks. However, the cost of these platforms often precludes the data center network from scaling beyond a traditional redundant network structure. As a result, network reliability suffers and performance is severely degraded (e.g., by 50% or greater) in the event of a network or power outage.

Further, the cost of these platforms also introduces severe challenges when the data center network core is required to support large traffic volumes between disparate data center availability zones. For example, while these devices are capable of supporting a large number of high-speed interfaces (e.g., on the order of 128 and 256 10-Gigabits per second interfaces), the cost of each interface can be exorbitant (i.e., due to the advanced capabilities of the platform) and making use of the potential maximum performance is difficult. To illustrate, link aggregation groups are limited to some maximum number of member interfaces (e.g., 8 ports), making it challenging to take advantage of performance potential. In addition, the modular nature of these platforms represents a "lock-in" to a specific vendor's hardware platform, adding extra cost and further restricting a data center network's ability to scale to that particular vendor's product lifecycle. Breaking out of this "lock-in" may be possible, but represents a significant investment in time, engineering, and cost. There is therefore a need for low-cost data center core architecture which enables higher cross-core performance, greater scalability, more extensible reliability models, and improved flexibility.

Accordingly, various embodiments described below were developed to provide a core network architecture which cost effectively meets scale, performance, and availability requirements. For example, the network architecture may include a data center core network architecture arranged and configured to provide a scalable, low-cost, and highly resilient core network for cloud data centers. The cloud data center core network according to the disclosed embodiments utilize commodity switches (e.g., commodity line rate 10 Gigabit Ethernet switches) to scale beyond Terabit data rates, for example. The 10 Gigabit Ethernet switches are combined, to form Open System Interconnection (OSI) layer 2 (i.e., data link layer) core modules, each of which may implement at least 80 Gigabits of cross-core bandwidth, for example (based on current generation products). Even greater cross-core bandwidth may be achieved as higher Gigabit Ethernet commodity switches are developed. Scalability may be achieved by deploying additional layer 2 core modules. Accordingly, core throughput is limited only be the port capacity of connected border routers and may scale well beyond 1 Terabit per second. As a result of the described architecture, a cloud service provider is able to build a massive scale data center while minimizing deployment of expensive feature-rich OSI layer 3 (i.e., network layer) switches and router interfaces. Further, according to the described architecture, connected border routers distribute traffic across the layer 2 core modules using standardized OSI layer 3 dynamic routing protocols, thereby avoiding the need to develop and deploy new network protocols, and resulting in a low-cost scalable architecture when compared to traditional data center network architectures.

In an example implementation developed to provide core network architecture, a network includes at least two core local area network (LAN) fabrics, each including a first core switch cluster deployed at a first sub-core and a second core switch cluster deployed at a second sub-core different from the first sub-core. Each core switch cluster comprises a pair of 10 Gigabit Ethernet core switches (i.e., commodity switches). The network further includes a multi-link aggregation group to link the first core switch cluster and the second core switch cluster. The linking of the first core switch cluster and the second core switch cluster creates a single core LAN fabric. At least two core LAN fabrics may be deployed to avoid the existence of a single failure correlation zone within the core. Further, the two core switch clusters (i.e., the first core switch cluster and the second core switch cluster) remain independent, thereby reducing the likelihood that a single configuration error can result in the outage of the entire core LAN fabric.

In addition, core capacity may be scaled by scaling the multi-link port aggregation port within each core LAN fabric. For example, the multi-link port aggregation group within each core LAN fabric may be scaled from 20 Gigabits per second to 80 Gigabits per second, thereby allowing each core LAN fabric to provide 160 Gigabits per second in cross-core capacity. It should be noted that scaling from 20 Gigabits per second to 80 Gigabits per second is an example based on currently available products and the described embodiments are not limited to these numbers, as increased capacities may be achieved as new hardware become available. Accordingly, additional or increased scaling may be achieved as desired. To further enhance availability, the core LAN fabric can be split into two physically isolated sub-cores where each sub-core is deployed within a separate facility, thereby avoiding correlated failure dependencies (e.g., power, seismic, fire, flood, etc.) and reducing the risk that a facility outage will result in the outage of the services hosted within the cloud data center.

The following description is broken into sections. The first, labeled "Components," describes examples of physical and logical components for implementing various embodiment. The second section, labeled "Operation," describes steps taken to implement various embodiments.

Figure 1:
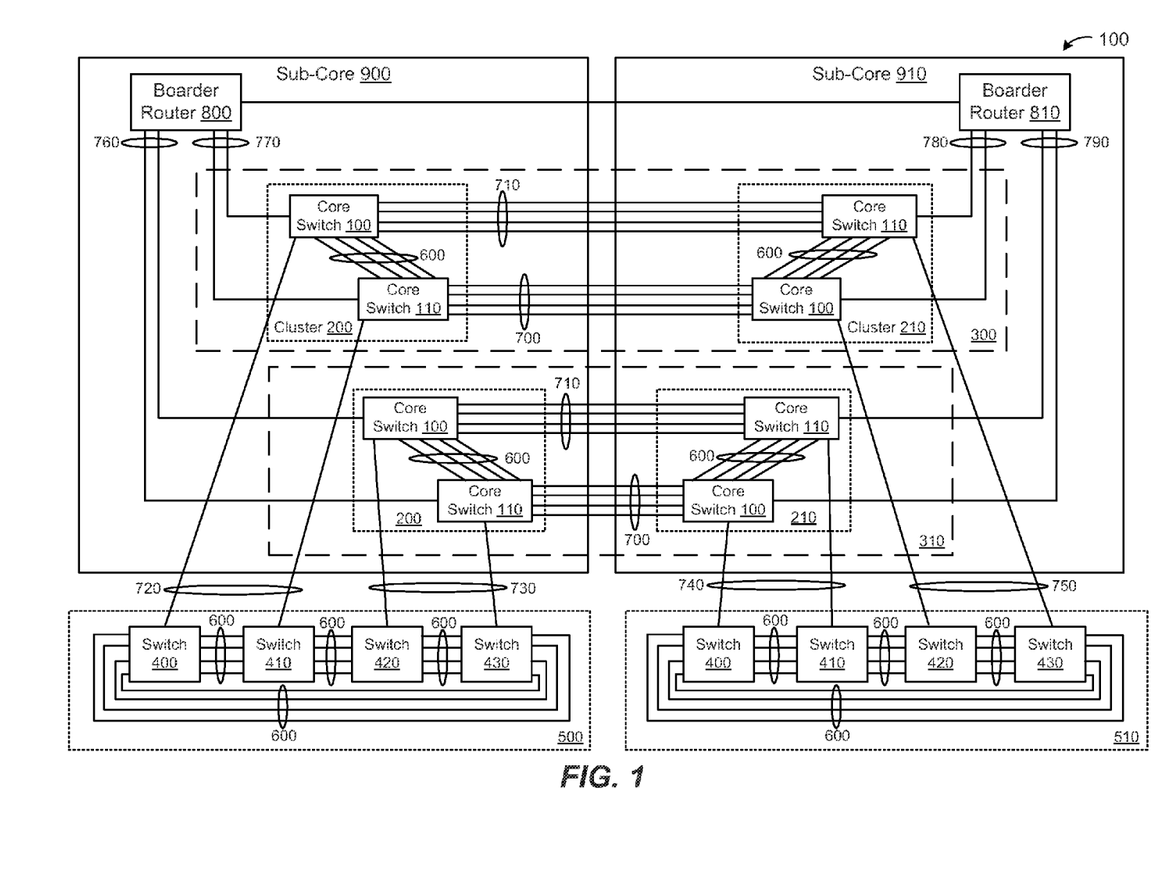
FIG. 1 is a block diagram of an example implementation of a core network architecture according to an embodiment.
Figure 2:
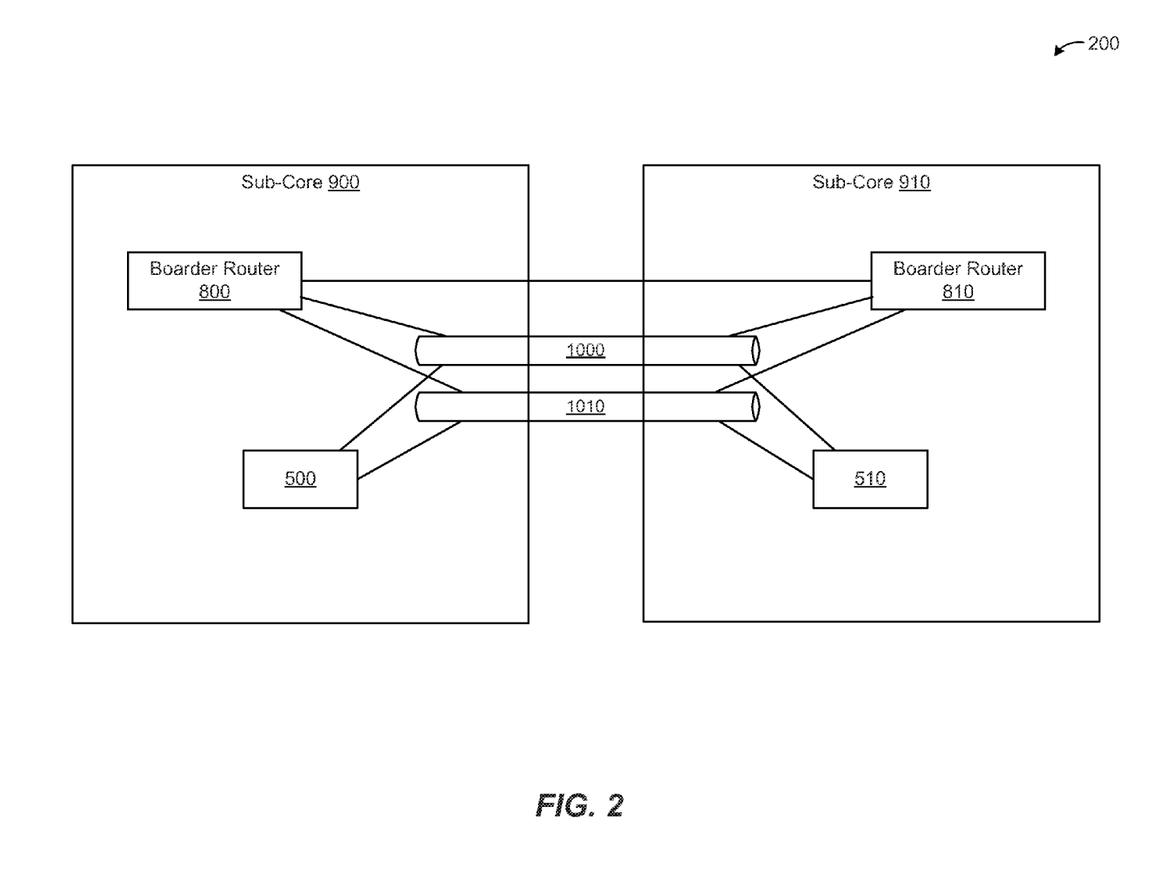
FIG. 2 is a block diagram of another example implementation of a core network architecture according to an embodiment.

Components:

FIGS. 1-2 depict examples of physical and logical components for implementing various embodiments. FIG. 1 depicts an example physical design of a network architecture 100 comprising at least two core LAN fabrics 300 and 310 (i.e., a first core LAN fabric 300 and a second core LAN fabric 310). For example, the network architecture 100 may represent a data center core network architecture.

Each of the core LAN fabric 300, 310 includes a first core switch cluster 200 and a second core switch cluster 210. Each of the first core switch cluster 200 and the second core switch cluster 210 includes a pair of commodity switches. For example, each of the core switch clusters 200, 210 may include a first core switch 100 and a second core switch 110. Further, the core switch pairs 100, 110 may each be 10 Gigabit Ethernet switches or other readily available over-the-shelf switches. Further, the switches of the core switch clusters 200, 210 may each include 24 ports, for example. It should be noted that the core switches 100, 110 are vendor neutral and may be selected from any combination of commodity line switches, avoiding vendor lock in or vendor dependency of the network architecture.

For each core switch cluster 200, 210, the first core switch 100 is connected to the second core switch 110 via a multi-port bridge aggregation group 600 (i.e., each pair of core switches 100, 100 is connected via the multi-port bridge aggregation group 600 to form a cluster 200, 210 of core switches). The multi-port bridge aggregation group 600 represents generally any combination of hardware and programming configured to connect and/or link the pair of core switches 100, 110 to construct the core switch cluster 200, 210. For example, the multi-port bridge aggregation group 600 may represent four 10 Gigabit Ethernet links configured to interconnect the pair of core switches 100, 110. In an example embodiment, the multi-port bridge aggregation group 600 may be configured to create a switch clustering virtual link, where each of the four 10 Gigabit Ethernet ports are configured as a single virtual port. According to this embodiment, the core switches 100, 110 may share a single configuration and make network traffic forwarding decisions as a single entity.

The core switch clusters 200, 210 are linked, via a multi-port link aggregation group 700, 710, as shown. For example, the first core switch cluster 200 may be linked to the second core switch cluster 210 via redundant multi-port link aggregation groups 700, 710 to create a single core LAN fabric 300, 310. Each of the multi-port link aggregation groups 700, 710 represents generally any combination of hardware and programming configured to link the first core switch cluster 200 and the second core switch cluster 210 to construct a core LAN fabric 300, 310. For example, each of the redundant multi-port link aggregation groups 700, 710 may be four 10 Gigabit Ethernet ports trunked together using standard link aggregation protocol, thereby enabling each multi-port link aggregation group 700, 710 to function as a single 40 Gigabit Ethernet port (i.e., using link aggregation control protocol (LACP)). Accordingly, dual multi-port link aggregation groups 700, 710 may be used to create a dual 40 Gigabit Ethernet ports (i.e., an 80 Gigabit Ethernet port). In one example embodiment, the multi-link aggregation group comprises a single multi-link aggregation group to ink the first core switch cluster 200 and the second core switch cluster 210 (e.g., a single 40 Gigabit Ethernet port, a single 80 Gigabit Ethernet port, etc).

Based on the above configurations, core LAN fabrics 300, 310 can be created, where each core LAN fabric 300, 310 comprises a first core switch cluster 200 and a second core switch cluster 210 linked via a multi-port link aggregation group 700, 710 and where the first core switch cluster 200 and the second core switch cluster 210 each include a pair of core switches 100, 110 connected via a multi-port bridge aggregation group 600. In an example embodiment, the first core switch cluster 200 may be deployed at a first sub-core 900 (or at a first data center location) while the second core switch cluster 210 is deployed at a second sub-core 910 (or at a second data center location) different from the first sub-core 910. For example, the first sub-core 900 may be physically isolated from the second sub-core 910 (i.e., to accomplish geographic diversity). To illustrate, the first sub-core 900 may be located at a first facility a few miles from a second facility that houses the second sub-core 910. Thus, the first core switch cluster 200 and the second core switch cluster 210 are independent, thereby reducing the likelihood that a configuration error can result in the outage of the entire core LAN fabric 300, 310.

Further, the above configuration creates a single isolated layer 2 core domain (i.e., a fault domain), where propagation of a fault is limited to only the core switches (i.e., 4 switches) that make up the domain. To illustrate, core LAN fabric 300 is a single isolated layer 2 fault domain limited to the 4 switches (first core switch cluster 200 pair and second core switch cluster pair 210) included in core LAN fabric 300. Similarly, core LAN fabric 310 is another single isolated layer 2 fault domain limited to the 4 switches included therein, A minimum of two core LAN fabrics 300, 310 may be deployed to avoid the existence of a single failure correlation zone within the core. Moreover, scalability and increased bandwidth (and increased throughput) may be achieved at low cost by providing additional core LAN fabrics comprising commodity switches arranged and configured as described above. In an example embodiment, the first core switch cluster 200 and the second core switch cluster 210 may be merged to create a single core switch cluster within each of the core LAN fabrics 300, 310. Core capacity may further be scaled by scaling the multi-port link aggregation groups 700, 710 within each of the core LAN fabrics 300, 310. For example, the multi-port link aggregation groups 700, 710 may be scaled from 20 Gigabits per second to 80 Gigabits per second allowing each core LAN fabric 300, 310 to provide as much as 160 Gigabits per second in cross-core capacity (based on currently available commodity switches). Deploying additional core LAN fabrics 300, 310 and connecting compute environment aggregation switch clusters 500, 510 (described below) provides even greater scalability.

The network architecture 100 also includes a first aggregation switch cluster 500 and a second aggregation switch cluster 510 connected to the first core switch cluster 200 and the second core switch cluster 210, respectively, of each of the core LAN fabrics 300, 310. For example, the first aggregation switch cluster 500 is connected to the first core switch cluster 200 of the first core LAN fabric 300 and to the first core switch cluster 200 of the second core LAN fabric 310 via a first multi-port link aggregation group 720, 730. Similarly, the second aggregation switch cluster 510 is connected to the second core switch cluster 210 of the first core LAN fabric 300 and to the second core switch cluster 210 of the second core LAN fabric 310 via second multi-port link aggregation group 740, 750. Accordingly, the first aggregation switch cluster 500 is connected to the first sub-core 900 and the second aggregation switch cluster 510 is connected to the second sub-core 900.

The first aggregation switch cluster 500 and the second aggregation switch cluster 510 each include a plurality of aggregation switches 400-430 connected via multi-port bridge aggregation group 600. Similar to the core cluster switches 200, 210, the aggregation switch clusters 500, 510 provide resiliency, improved performance, and agility. Each aggregation switch cluster 500, 51.0 is connected to a single core switch cluster 200, 210 via multi-port link aggregation groups 720-750. Thus, the multi-port link aggregation groups 720-750 may be scaled from 20 Gigabits per second to 80 Gigabits per second, for example, allowing a cloud data center compute environment's core connectivity to scale from 40 Gigabits per second to multiple hundred Gigabits per second, constrained only by the number of core LAN fabrics 300, 310 deployed and the port density of the aggregation switches 400-430. In one example embodiment, the multi-port link aggregation groups 720-750 represent a single connection for linking the aggregation switch clusters 500, 510 to the core switch clusters 200, 210.

The network architecture 100 further comprises border routers 800, 810 connected to the core switch clusters 200, 210, as shown. A first border router 800 is connected to the first core switch cluster 200 of each of the core LAN fabrics 300, 310 via multi-port link aggregation groups 760, 770, and a second border router 810 is connected to the second core switch cluster 210 of each of the core LAN fabrics 300, 310 via multi-port link aggregation groups 780-790. In an example embodiment, the multi-link aggregation groups 760, 770 connecting the first border router 800 to the first core switch clusters 200 may represent a single (logical) connection. Similarly, the multi-link aggregation groups 780, 790 connecting the second border router 810 to the second core switch clusters 210 may represent a single (logical) connection. To further enhance availability and fault independence, the first border router 800 may be deployed at the first sub-core 900 and the second border router 810 may be deployed, at the second sub-core. The border routers 800, 810 are deployed and configured to support the integration of telecommunication circuits and service provider peering, and each border router 800, 810 is connected to at least a pair of core LAN fabric 300, 310 and to a single core switch cluster 200, 210 within each core LAN fabric 300, 310. This ensures both path diversity and scalability. However, it is not required that every border muter 800, 810 be connected to every core LAN fabric 300, 310 in the network architecture 100. This allows the cloud provider to scale intra-data center communications between compute environments across the data center's core to be scaled independently of the data center's Internet or provider access capacity.

As described above, availability of a data center is further enhanced by splitting the data center core into two physically isolated sub-cores 900, 910, where each sub-core 900, 910 is deployed within a separate facility (e.g., data center facility) to avoid correlated failure dependencies (e.g., power, seismic, fire, flood, etc). This configuration reduces the risk that a facility outage will result in the outage of the services hosted within the cloud data center. Thus, a single compute environment (typically hosted within the same facility as a particular sub-core 900, 910) is connected to a single sub-core 900, 910 and is provided with highly resilient and highly scalable access to the data center core.

FIG. 2 depicts an example of a logical design of the network architecture 100 of FIG. 1. The network architecture 100 comprises the first sub-core 900 and the second sub-core 910, where the first sub-core 900 and the second sub-core 910 are physically isolated from each other. Each core switch cluster 200, 210 of FIG. 1 is configured to support a single core integration virtual LAN 1000, 1010. For example, the first core switch cluster 200 and the second core switch cluster 210 of the first core LAN fabric 300 together logically represent a first core integration virtual LAN 1000. Similarly, the first core switch cluster 200 and the second core switch cluster 210 of the second core LAN fabric 310 together logically represent the second core integration virtual LAN 1010. Further, the multi-link aggregation groups (i.e., 720, 730, 740, 750) provisioned between each aggregation switch cluster 500, 510 and each core LAN fabric 300, 310 represent a single logical connection. Similarly, the multi-link aggregation groups (i.e. 760, 770, 780, 790) provisioned between each boarder router 800, 810 and each core LAN fabric 300, 310 represent a single logical connection. Thus, a single logical connection is provided between the aggregation switch clusters 500, 510 and the core LAN fabrics 300, 310, and a single logical connection is provided, between the border routers 800, 810 and the core LAN fabrics 300, 310. Accordingly, core integration VLAN 1000 and core integration VLAN 1010 are logical representation of first core LAN fabric 300 and second core LAN fabric 310 of FIG. 1, respectively.

The border routers 800, 810 are configured as border gateway protocol (BGP) route reflectors and are configured to distribute data center routing tables across the aggregation switch clusters 500, 510. Each aggregation switch cluster 500, 510 maintains a BGP neighbor relationship with every other aggregation switch cluster 500, 510 and with each border router 800, 810. As a result, network traffic traverses the data center core destined for the aggregation switch clusters 500, 510 or the border routers 800, 810, calculated as the best route by a source aggregation switch cluster 500, 510. In addition, since each multi-link aggregation group 720, 730,

740, 750 represents a separate logical link to the data center core, traffic is distributed across the multiple logical interfaces to the data center core allowing the cloud provider to take advantage of the network capacity which has been deployed.

In foregoing discussion, the components of FIGS. 1 and 2 that make up the network architecture 100 were described as combination of hardware and programming. Such components may be implemented in a number of fashions. Looking at FIG. 3, the programming may be processor executable instructions stored on tangible, non-transitory computer-readable storage medium 302 and the hardware may include processor 304 for executing those instructions. Processor 304, for example, can include one or multiple processors. Such multiple processors may be integrated in a single device or distributed across devices. Computer-readable storage medium 302 can be said to store program instructions that when executed by processor 304 implements the network architecture 102 of FIGS. 1 and 2. Medium 302 may be integrated in the same device as processor 304 or it may be separate but accessible to that device and processor 304. In an example embodiment, medium 302, processor 304, or a combination thereof, may be implemented in any of the core switches 100-110, the aggregation switches 400-430, and the border routers 800-810. Alternatively, or in addition, medium 302 and processor 304 may be implemented in a controller connected to the core switches 100-110, the aggregation switches 400-430, and the border routers 800-810 and that controls the functionalities and operation of the core switches 100-110, the aggregation switches 400-430, and the border router 800-810.

In one example, the program instructions can be part of an installation package that when installed can be executed by processor 304 to implement the network architecture 102. In this case, medium 302 may be a portable medium such as a CD, DVD, or flash drive or a memory maintained by a server from which the installation package can be downloaded, or installed. In another example, the program instructions may be part of an application or applications already installed. Here, medium 302 can include integrated memory such as hard drive, solid state drive, or the like.

Figure 3:
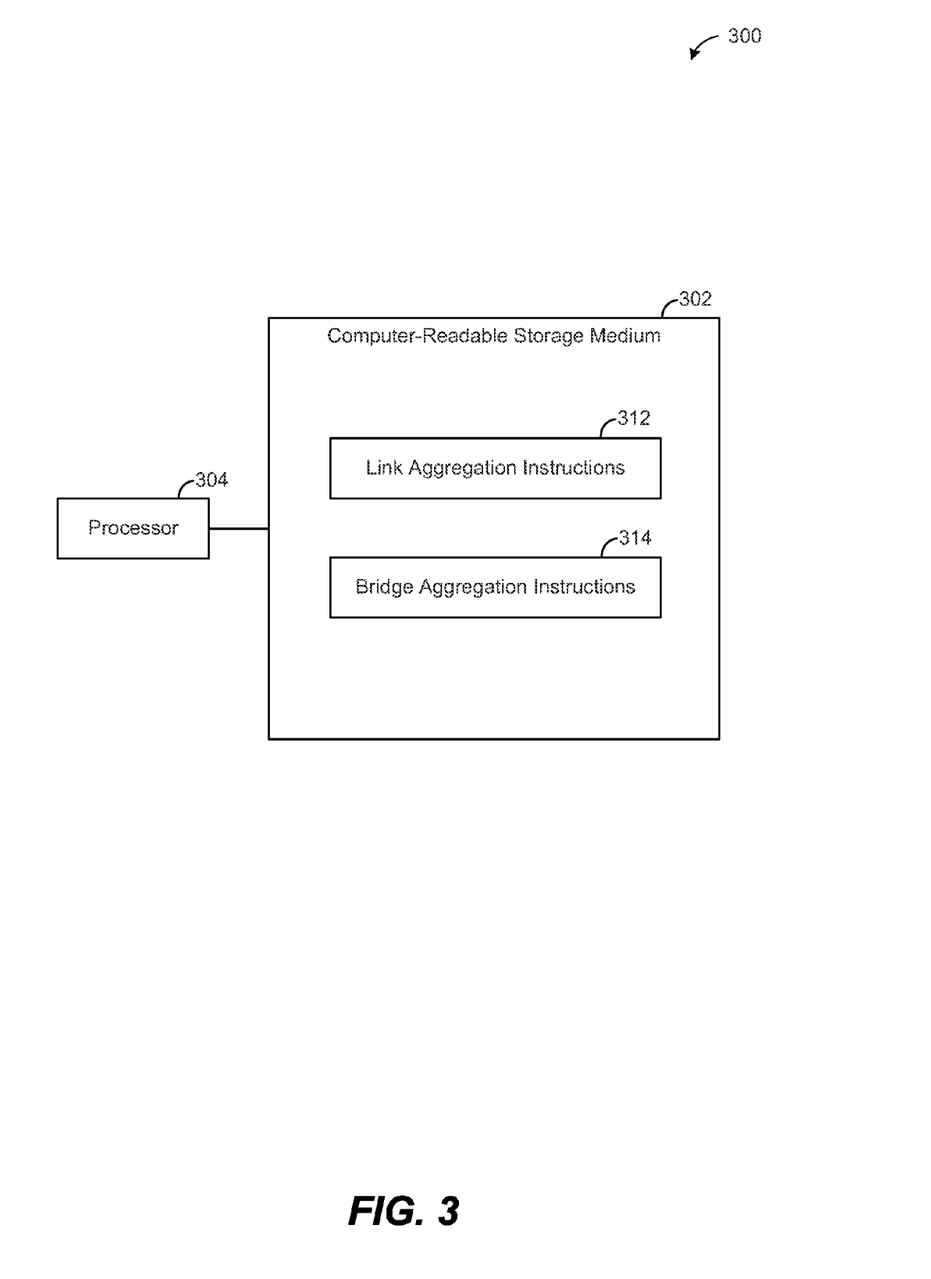
FIG. 3 is a block diagram depicting a computer-readable medium according to an embodiment.

In FIG. 3, the executable program instructions stored in medium 302 are represented as link aggregation instructions 312 and bridge aggregation instructions 314 that when executed by processor 304 implement the network architecture 102 of FIGS. 1 and 2. Link aggregation instructions 312 represent program instructions that when executed implement multi-port link aggregation groups 700-710, link aggregation groups 720-750, and link aggregation groups 760-790. For example, link aggregation instructions 312 may be executed to link the first core switch cluster 200 located at the first sub-core 900 and the second core switch cluster 210 located at the second sub-core 910, where the first core switch cluster 200 and the second core switch cluster 210 are linked to form a core LAN fabric 300, 310. The link aggregation instructions 312 are further executed to link the first core switch cluster 200 with the first aggregation switch cluster 500 at the first sub-core 900 and to link the second core switch cluster 210 with the second aggregation switch cluster 510 at the second sub-core 910. In addition, the link aggregation instructions 312 may be executed to link the first core switch cluster 200 with the first border router 800 and to link the second core switch cluster 210 with the second border router 810. The link aggregation instructions 312 may further be executed to implement link aggregation control protocol (LACP) or other standard protocols for linking various combinations of switches and routers.

Bridge aggregation instructions 314 represent program instructions that when executed implement multi-port link bridge aggregation groups 600. For example, bridge aggregation instructions 314 may be executed to connect the first core switch 100 and the second core switch 100 to form core switch clusters 200, 210. Further, bridge aggregation instructions 314 may be executed to connect the aggregation switches 400-430 in each of the aggregation switch clusters 500, 510. The bridge aggregation instructions 314 may further be executed to implement standard protocols for connecting switches.

Figure 4:
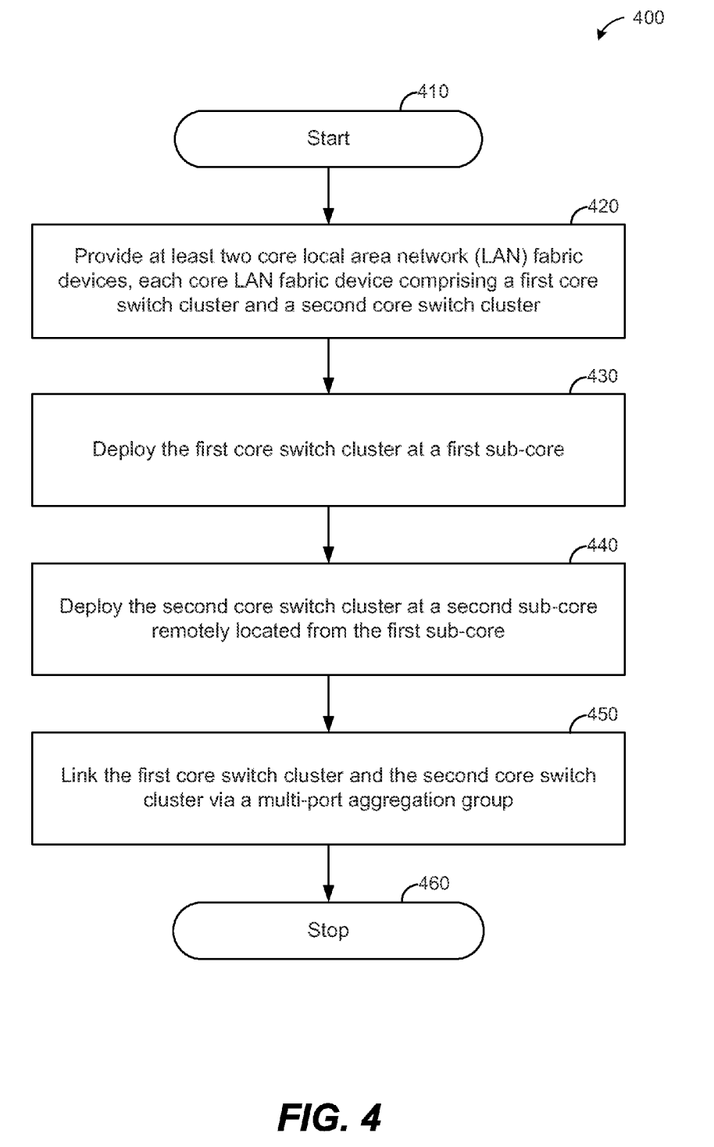
FIGS. 4-6 are flow diagrams depicting steps taken to implement embodiments.
Figure 5:
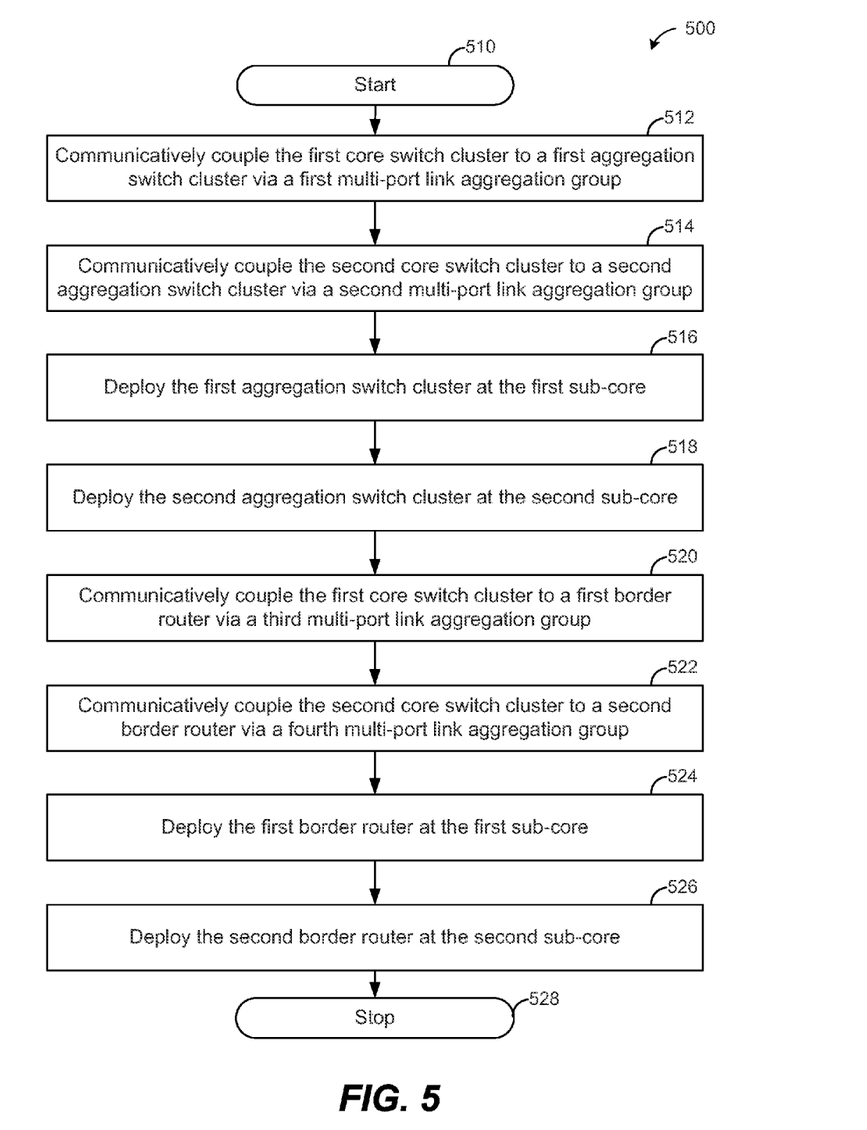
Figure 6:
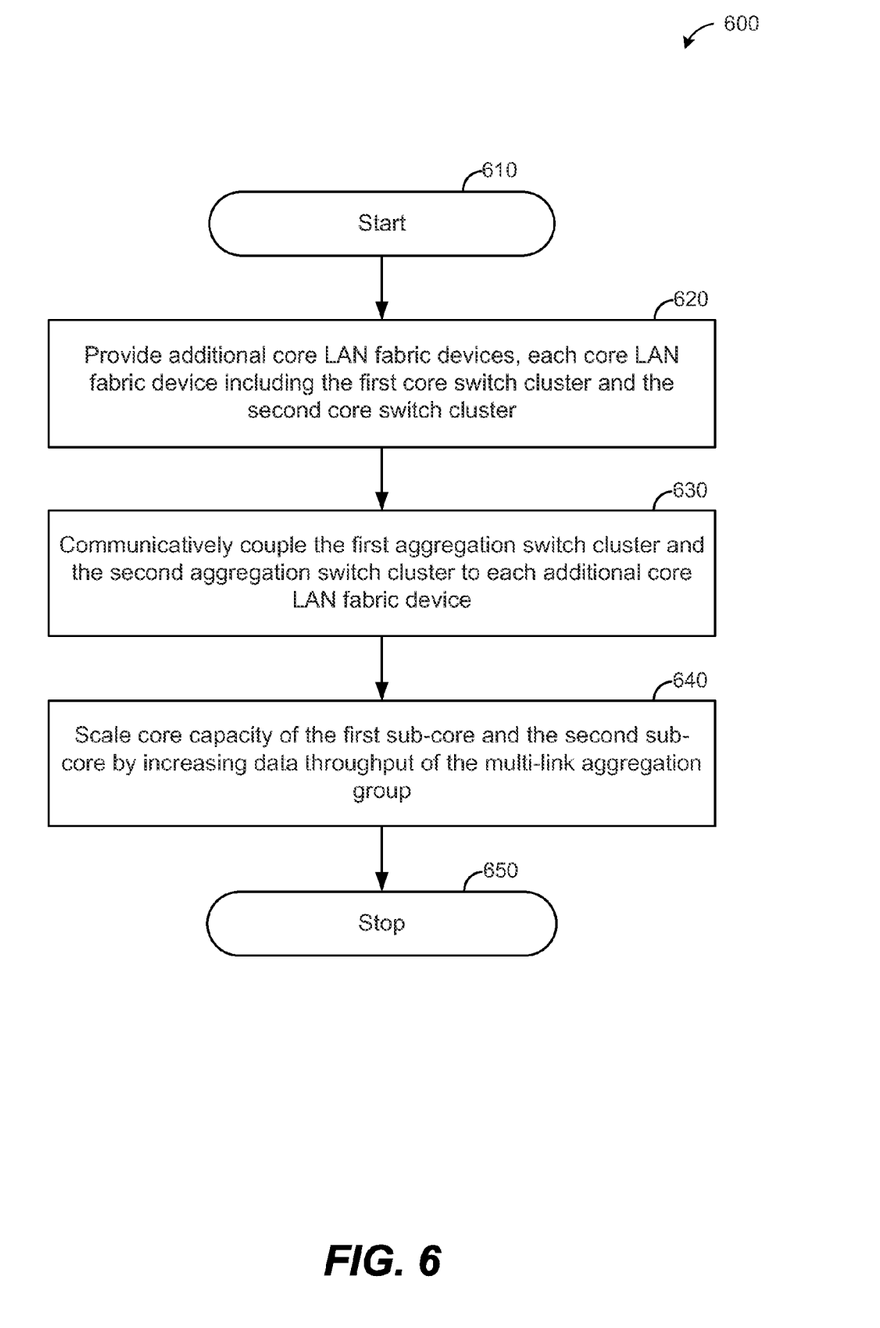

Operation:

FIGS. 4-6 are example flow diagrams of steps taken to implement embodiments of a method of providing a core network architecture. In discussing FIGS. 4-6, reference is made to the diagrams of FIGS. 1-2 to provide contextual examples. Implementation, however, is not limited to those examples.

Starting with FIG. 4, a flowchart of an embodiment of a method 400 for implementing core network architecture is described. Method 400 may start in step 410 and proceed to step 420, where at least two core LAN fabric devices are provided, each core LAN fabric including a first core switch cluster and a second core switch cluster. Referring to FIG. 1, the first core LAN fabric 300 includes the first core switch cluster 200 and the second core switch cluster 210. Similarly, the second core LAN fabric 310 includes the first core switch cluster 200 and the second core switch cluster 210. Additional core LAN fabrics 300, 310 may be provided to for scalability. The core switches 100, 110 that make up the core switch clusters 200, 210 are commodity switches.

Method 400 also includes step 430, where the first core switch cluster is deployed at a first sub-core and step 440, where the second core switch cluster is deployed at a second sub-core remotely located from the first sub-core. Referring to FIG. 1, the first core switch cluster 200 is deployed at the first sub-core 900 and the second core switch cluster 210 is deployed at the second sub-core 910 physically isolated from the first sub-core 900 to avoid correlated failure dependencies such as power, seismic, fire, flood, or other occurrences that may result in a failure of a sub-core.

Method 400 may proceed to step 450, where the first core switch cluster and the second core switch cluster are linked via a multi-port link aggregation group. Referring to FIG. 1, the first core switch cluster 200 and the second core switch cluster 210 are linked via multi-port link aggregation group 700, 710. In an embodiment, multi-port link aggregation group 700, 710 may function as a single link. Method 400 may then proceed to step 460, where the method 400 stops.

FIG. 5 depicts a flowchart of an embodiment of a method 500 for implementing a core network architecture. Method 500 may start in step 510 and proceed to step 512, where the first core switch cluster is communicatively coupled to a first aggregation switch cluster via a first multi-port link aggregation group and step 514, where the second core switch cluster is communicatively coupled to a second aggregation switch cluster via a second multi-port link aggregation group. Referring to FIG. 1, the first aggregation switch cluster 500 is connected to the first core switch cluster 200 of the first core LAN fabric 300 and to the first core switch cluster 200 of the second core LAN fabric 310 via the first multi-port link aggregation group 720, 730. Similarly, the second aggregation switch cluster 510 is connected to the second core switch cluster 210 of the first core LAN fabric 300 and to the second core switch cluster 210 of the second core LAN fabric 310 via the second multi-port link aggregation group 740, 750. The first aggregation switch cluster 500 and the second aggregation switch cluster 510 each comprises a plurality of aggregation switches 400-430.

Method 500 also includes step 516, where the first aggregation switch cluster is deployed at the first sub-core and step 518, where the second aggregation switch cluster is deployed at the second sub-core. Referring to FIG. 2, the first aggregation switch cluster 500 is located within the first sub-core 900 and the second aggregation switch cluster 510 is located within the second sub-core 910. Alternately or in addition, the first aggregation switch cluster 500 is connected to the first sub-core 900 and the second aggregation switch cluster 510 is connected to the second sub-core 910.

Method 500 further includes step 520, where the first core switch cluster is communicatively coupled to a first border router via a third multi-port link aggregation group and step 522, where the second core switch cluster is communicatively coupled to a second border router via a fourth multi-port link aggregation group. Referring to FIG. 1, the first border router 800 is connected to the first core switch cluster 200 of each of the core LAN fabrics 300, 310 via multi-port link aggregation groups 760, 770, and the second border router 810 is connected to the second core switch cluster 210 of each of the core LAN fabrics 300, 310 via multi-port link aggregation groups 780-790.

Method 500 also includes step 524, where the first border router is deployed at the first sub-core and step 526, where the second border router is deployed at the second sub-core. Referring to FIG. 1, the first border router 800 is located within the first sub-core 900 and the second border router 810 is located within the second sub-core 910. Method. 500 may then proceed to step 528, where the method 500 stops.

FIG. 6 depicts a flowchart of an embodiment of a method 600 for implementing a core network architecture. Method 600 may start in step 610 and proceed to step 620, where additional core LAN fabric devices are provided, each core LAN fabric including the first core switch cluster and the second core switch cluster. Referring to FIG. 1, scalability and increased bandwidth may be achieved at low cost by providing additional core LAN fabrics comprising commodity switches.

Method 600 also includes step 630, where the first aggregation switch cluster and the second aggregation switch cluster are communicatively coupled to each additional core LAN fabric provided. Referring to FIG. 1, the first aggregation switch cluster 500 and the second aggregation switch cluster 510 are connected to each core LAN fabric 300, 310 via multi-link aggregation ports 720-750.

Method 600 further includes step 640, where core capacity of the first sub-core and the second sub-core are scaled by increasing data throughput of the multi-port link aggregation group. Referring to FIG. 1, for example, the multi-port link aggregation group 720-750 may be scaled from 20 Gigabits per second to 80 Gigabits per second, allowing the core capacity to scale from 40 Gigabits per second to multiple hundred Gigabits per second. Method 600 may then proceed to step 650, where the method 600 stops.

CONCLUSION

FIGS. 1-3 depict architecture, functionality, and operation of various embodiments. In particular, FIGS. 1-3 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Embodiments can be realized in any computer-readable medium for use by or in connection with an instruction execution system such as a computer/processor based system or an ASIC (Application Specific Integrated Circuit) or other system that can fetch or obtain the logic from computer-readable medium and execute the instructions contained therein. "Computer-readable medium" can be any individual medium or distinct media that can contain, store, or maintain a set of instructions and data for use by or in connection with the instructions execution system. A computer-readable medium can comprise any one or more of many physical, non-transitory media such as, for example, electronic, magnetic, optical, electromagnetic, or semiconductor device. More specific examples of a computer-readable medium include, but are not limited to, a portable magnetic computer diskette such as floppy diskettes, hard drives, solid state drives, random access memory (RAM), read-only memory (ROM), erasable programmable read-only memory, flash drives, and portable compact discs.

Although the flow diagrams of FIGS. 4-6 show specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. A network comprising:
   at least two core local area network (LAN) fabrics, each comprising:
   a first core switch cluster deployed at a first sub-core and connected to a first aggregation switch cluster located in the first sub-core via a first multi-port link aggregation group;
   a second core switch cluster deployed at a second sub-core different from the first sub-core and connected to a second aggregation switch cluster located in the second sub-core via a second multi-port link aggregation group; and
   a third multi-port link aggregation group to link the first core switch cluster and the second core switch cluster.

2. The network of claim 1, wherein the first core switch cluster and the second core switch cluster each comprises:
   a first core switch;
   a second core switch; and
   a multi-port bridge aggregation group to connect the first core switch and the second core switch.

3. The network of claim 1, wherein each of the first multi-port link aggregation group and the second multi-port link aggregation group is configured to scale from 20 Gigabits per second to at least 80 Gigabits per second.

4. The network of claim 3, wherein the first multi-port link aggregation group is a first single logical connection between the first aggregation switch cluster and each of the at least two core LAN fabrics, and wherein the second multi-port link aggregation group is a second single logical connection between the second aggregation switch cluster and each of the at least two core LAN fabrics.

5. The network of claim 3, wherein each of the first aggregation switch cluster and the second aggregation switch cluster comprises a plurality of aggregation switches connected via a multi-port bridge aggregation group.

6. The network of claim 1, further comprising:
a first border router connected to the first core switch cluster of each of the at least two core LAN fabric via a fourth multi-port link aggregation group and a fifth multi-port link aggregation group; and
a second border router connected to the second core switch cluster of each of the at least two core LAN fabrics via a sixth multi-port link aggregation group and a seventh multi-port link aggregation group,
wherein the first border router is located in the first sub-core and wherein the second border router is located in the second sub-core.

7. The network of claim 6, wherein one of the first border router and the second border router is not connected to the at least two core LAN fabrics.

8. The network of claim 6, wherein the fourth multi-port link aggregation group and the fifth multi-port link aggregation group is a first single logical connection between the first border router and each of the at least two core LAN fabrics and wherein the sixth multi-port link aggregation group and the seventh multi-port link aggregation group is a second single logical connection between the second border and each of the at least two core LAN fabrics.

9. The network of claim 6, wherein the first border router and the second border router are each border gateway protocol (BGP) route reflectors configured to distribute data center routing tables across a first aggregation switch cluster and a second aggregation switch cluster.

10. The network of 9, wherein each of the first aggregation switch cluster and the second aggregation switch cluster are configured to maintain a BGP neighbor relationship with each other and with each of the first border router and the second border router.

11. The network of claim 1, wherein the network is a data center core network, wherein the first sub-core is deployed at a first data center and wherein the second sub-core is deployed at a second data center different from and physically isolated from the first data center.

12. The network of claim 1, wherein each of the first core switch cluster and the second core switch cluster is configured to support a single core integration virtual LAN.

13. The network of claim 1, wherein the first core switch cluster and the second core switch cluster each comprises a pair of 10 Gigabit Ethernet core switches.

14. The network of claim 1, wherein the third multi-link aggregation group includes a eighth multi-link aggregation group and a ninth multi-link aggregation group each having a data throughput of 20 Gigabits per second.

15. The network of claim 14, wherein each of the eighth multi-link aggregation group and the ninth multi-link aggregation group are scalable to provide an increased data throughput.

16. The network of claim 1, wherein the first core switch cluster and the second core switch cluster comprise a single core switch cluster.

17. The network of claim 1, wherein the third multi-link aggregation group comprises a single multi-link aggregation group to link the first core switch cluster and the second core switch cluster.

18. A method comprising:
providing at least two local area network (LAN) fabric devices, each LAN fabric comprising a first core switch cluster, a second core switch cluster, a first aggregation switch cluster, and a second aggregation switch cluster;
deploying the first core switch cluster and the first aggregation switch cluster, connected to the first core switch cluster via a first multi-port link aggregation group, at a first sub-core;
deploying the second core switch cluster and the second aggregation switch cluster, connected to the first core switch cluster via a second multi-port link aggregation group, at a second sub-core remotely located from the first sub-core; and
linking the first core switch cluster and the second core switch cluster via a third multi-port link aggregation group.

19. The method of claim 18, further comprising:
communicatively coupling the first core switch cluster to a first border router via a fourth multi-port link aggregation group;
communicatively coupling the second core switch cluster to a second border router via a fifth multi-port link aggregation group;
deploying the first border router at the first sub-core; and
deploying the second border router at the second sub-core.

20. The method of claim 18, further comprising:
providing additional LAN fabric devices, each LAN fabric comprising the first core switch cluster and the second switch cluster; and
communicatively coupling the first aggregation switch cluster and the second aggregation switch cluster to each additional LAN fabric device.

21. The method of claim 18, further comprising scaling a core capacity of the first sub-core and the second-sub core, wherein scaling comprises increasing a data throughput of the third multi-link aggregation group.

22. The method of claim 21, further comprising increasing a data throughput of the first multi-port aggregation group, the second multi-port aggregation group, or a combination thereof.

23. The method of claim 18, further comprising combining the first core switch cluster and the second core switch cluster into a single core switch cluster.

24. A non-transitory computer-readable medium comprising instructions that, when executed by a processor, cause the processor to:
link a first core switch cluster located at a first sub-core and a second core switch cluster located at a second sub-core via a first multi-port aggregation group, wherein the first core switch cluster and the second core switch cluster form a local area network (LAN) fabric;
link the first core switch cluster with a first aggregation switch cluster at the first sub-core via a second multi-port link aggregation group; and
link the second core switch cluster with a second aggregation switch cluster at the second sub-core via a third multi-port aggregation group.

25. The non-transitory computer-readable medium of claim 24, further comprising instructions executable by the processor to:
link the first core switch cluster with a first border router at the first sub-core; and
link the second core switch cluster with a second border router at the second sub-core.

26. The non-transitory computer-readable medium of claim 25, further comprising instructions executable by the processor to:
link the first aggregation switch cluster with the first core switch cluster of an additional LAN fabric;

link the second aggregation switch cluster with the second core switch cluster of the additional LAN fabric.

27. The non-transitory computer-readable medium of claim 24, wherein the first core switch cluster and the second core switch cluster each comprises a first core switch and a second core switch.

28. The non-transitory computer-readable medium of claim 27, further comprising instructions executable by the processor to connect the first core switch and the second core switch.

* * * * *

UNITED STATES PATENT AND TRADEMARK OFFICE
CERTIFICATE OF CORRECTION

PATENT NO. : 9,106,578 B2  Page 1 of 1
APPLICATION NO. : 13/485837
DATED : August 11, 2015
INVENTOR(S) : Stiekes It is certified that error appears in the above-identified patent and that said Letters Patent is hereby corrected as shown below:

In the specification

Column 1, line 43, delete "combined," and insert -- combined --, therefor.

Column 4, line 12, delete "linked," and insert -- linked --, therefor.

Column 4, line 31, delete "ink" and insert -- link --, therefor.

Column 4, line 64, delete "therein," and insert -- therein --, therefor.

Column 5, line 41, delete "51.0" and insert -- 510 --, therefor.

Column 6, line 3, delete "deployed," and insert -- deployed --, therefor.

Column 6, line 11, delete "muter" and insert -- router --, therefor.

Column 6, line 51, delete "provided," and insert -- provided --, therefor.

Column 7, line 37, delete "downloaded," and insert -- downloaded --, therefor.

Column 9, line 31, delete "Method. 500" and insert -- Method 500 --, therefor.

Column 9, line 61, delete "depict architecture," and insert -- depict the architecture, --, therefor.

In the claims

Column 11, line 34, Claim 10, delete "The network of" and insert -- The network of claim --, therefor.

Signed and Sealed this
Eighth Day of March, 2016

Michelle K. Lee
*Director of the United States Patent and Trademark Office*